United States Patent [19]

Takada et al.

[11] Patent Number: 4,840,467
[45] Date of Patent: Jun. 20, 1989

[54] COMPACT ZOOM LENS SYSTEM WITH A HIGH ZOOMING RATIO

[75] Inventors: Katsuhiro Takada; Takanori Yamanashi, both of Tokyo, Japan

[73] Assignee: Olympus Optical Co., Ltd., Tokyo, Japan

[21] Appl. No.: 137,678

[22] Filed: Dec. 24, 1987

[30] Foreign Application Priority Data

Dec. 25, 1986 [JP] Japan ................................ 61-307797

[51] Int. Cl.⁴ ............................................... G02B 15/14
[52] U.S. Cl. .................................... 350/427; 350/413
[58] Field of Search ......................... 350/423, 427, 413

[56] References Cited

U.S. PATENT DOCUMENTS 4,571,032  2/1986  Someya et al. .................. 350/413 X
4,730,906  3/1988  Okudaira .......................... 350/413 X

FOREIGN PATENT DOCUMENTS

57-201213  12/1982  Japan .
58-137813   8/1983  Japan .
61-148414   7/1986  Japan .

Primary Examiner—Bruce Y. Arnold
Assistant Examiner—Scott J. Sugarman
Attorney, Agent, or Firm—Cushman, Darby & Cushman

[57] ABSTRACT

A compact zoom lens system with a high zooming ratio comprises, in order from the object side, a first lens group having a positive refracting power, a second lens group having a positive refracting power and a third lens group having a negative refracting power, in which the first lens group, the second lens group and the third lens group are respectively moved on the optical axis toward the object side during the zooming operation taking place from the wide-angle position as the reference point to the telephoto position, and at least one graded refractive index lens of an axial type which has the distribution of its refractive index in the direction of the optical axis is arranged in at least one lens group, so that the zooming ratio exceeds 2, the fluctuation of aberrations during the zooming operation is small and the flatness of the image surface is favorable.

10 Claims, 6 Drawing Sheets

COMPACT ZOOM LENS SYSTEM WITH A HIGH ZOOMING RATIO

BACKGROUND OF THE INVENTION (a) Field of the Invention:

The present invention relates to a compact zoom lens system having a zooming ratio of no less than 2 wherein aberrations are favorably corrected.

(b) Description of the prior art:

Recently, together with the progress in the compactness of cameras, there has been required a compact zoom lens system having a short length. In lens shutter cameras, in which automated systems have been developed and ease of carriage has been regarded as important, the limitation of a back focal length is not so severe but the requirement of more compactness is strong.

As a lens system of this kind, a zoom lens system for use in a lens shutter camera characterized by a simple lens configuration has been disclosed in Japanese Published Unexamined patent application No. 201213/82. This zoom lens system is of so-called two groups-type which comprises, in order from the object side, a first lens group having a positive refracting power and a second lens group having a negative refracting power and is arranged to be zoomed by varying the space between these lens groups.

In Japanese Published Unexamined Patent Application No. 137813/83, moreover, there has been disclosed a zoom lens system of three groups-type which is considered to be developed from the above-mentioned two groups-type zooming system. In a zoom lens system having such a configuration, in the case where a zooming ratio thereof is about 1.5, it is possible to make a compact lens system which comprises a small number of lens components. However, in the case where the zooming ratio is made to be about 2, magnification shared by a lens group used as a variator will become large so that the fluctuation of aberrations during the zooming operation will become large and the number of lens components necessary for the correction of aberrations will increase, which results in the enlargement of the zoom lens system as a whole. Therefore, for a zoom lens system having such a lens configuration, it is impossible to make the optical performance favorable and to attain the compactness of the zoom lens system.

In order to overcome the problems mentioned in the above, a zoom lens system of two groups-type has recently been developed which comprises a graded refractive index lens, i.e., a lens made of the medium whose refractive index varies gradually according to the radial distance from the optical axis. This system has been disclosed in applications such as in Japanese Published Unexamined patent application No. 148414/86, etc.

This zoom lens system comprises, as a lens component, a graded refractive index lens of a radial type which has the distribution of refractive index in the radial direction from the optical axis so that the refracting power is shared by the lens medium to thereby control the fluctuation of aberrations during the zooming operation and favorably keep Petzval's sum which contributes to the flatness of an image surface while maintaining the refracting powers of the respective lens components to be strong.

In this zoom lens system, the object thereof is to have a zooming ratio up to 2 and the correction for Petzval's sum is attained sufficiently. However, other aberrations are not corrected sufficiently, and this remains a problem to be solved hereinafter. Moreover, the zoom lens system has the defect that the back focal length thereof was extremely short so that the problem has not been solved in that the rear lens group thereof becomes large in size and the compactness thereof is not sufficiently attained.

SUMMARY OF THE INVENTION

It is, therefore, the primary object of the present invention to provide a compact zoom lens system with a high zooming ratio having a simple lens group configuration in which the zooming ratio from the wide-angle position to the telephoto position exceeds 2, the fluctuation of aberrations during the zooming operation is small and the image forming performance is favorable from the center of the image to periphery thereof.

In order to attain this object, a zoom lens system according to the present invention comprises, in order from the object side, a first lens group having a positive refracting power, a second lens group having a positive refracting power and a third lens group having a negative refracting power, in which the first lens group, the second lens group and the third lens group are respectively movable on the optical axis toward the object side during the zooming operation taking place from the wide-angle position as the reference point to the telephoto position and at least one graded refractive index lens of a so called axial type which has the distribution of its refractive index in the direction of the optical axis is arranged in at least one lens group.

In the zoom lens system according to the present invention based on such a simple lens configuration as mentioned above, in order to maintain a predetermined zooming ratio, to basically shorten the total length of the lens system and to control the fluctuation of aberrations during the zooming operation to be as small as possible, the respective lens groups are moved independently so as to distribute a zooming ratio to be shared among the respective lens groups to thereby attain a sufficient telephoto ratio in the telephoto position and a high zooming ratio easily.

In such an arrangement, in order to shorten the total length of the zoom lens system, it is necessary for the lens system to have a refracting power arrangement of a telephoto type especially in the wide-angle position. Thus the refracting power of the third lens group is set to be negative.

Moreover, in order to share a sufficient zooming ratio among the respective lens groups while controlling the fluctuation of aberrations to be small during the zooming operation, it is effective that the second lens group comprises, in order from the object side, a front lens group having a negative refracting power and a rear lens group having a positive refracting power.

On the premise that the lens group configuration mentioned above is employed and a suitable arrangement of the refracting powers is decided, in order to obtain the lens system in which the flatness of the image surface is so favorable as has not been seen hitherto, it is desirable to keep the amounts of aberrations generated in the respective lens groups small. In this case, it is difficult to attain the better optical performance at the peripheral portion of the image surface in the wide-angle position. Therefore, according to the present invention, the graded refractive index lens is employed as a lens component.

The above-mentioned graded refractive index lens of an axial type used in the zoom lens system according to the present invention does not have a refracting power in the lens medium and, as is mentioned above, does not have an effect to correct Petzval's sum so that it is necessary to determine the arrangement of the refracting powers of the zoom lens system and the behavior during the zooming operation in the state in which there is no refractive index distribution.

In order to obtain the compact zoom lens system having a predetermined zooming ratio, it is necessary for the third lens group to satisfy the following conditions (1) and (2):

$$0.4 < |f_3/f_W| < 2 \quad (1)$$

$$1 < \beta_{3T}/\beta_{3W} < 3 \quad (2)$$

wherein reference symbol $f_W$ represents the focal length of the zoom lens system as a whole in the wide-angle position, reference symbol $f_3$ represents the focal length of the third lens group, reference symbol $\beta_{3W}$ represents the lateral magnification of the third lens group in the wide-angle position, reference symbol $\beta_{3T}$ represents the lateral magnification of the third lens group in the telephoto position.

The condition (1) is established for regulating the refracting power of the third lens group and for the compactness of the zoom lens system. When the upper limit of this condition is exceeded, the refracting power of the third lens group will become weak so that the zoom lens system will become large in size, which is contrary to the compactness of the zoom lens system which is the object of the present invention. When the lower limit thereof is exceeded, the refracting power of the third lens group will become too strong and the amounts of aberrations generated in this lens group will extremely large to thereby result in the enlargement of the fluctuation of aberration during the zooming operation, so that it will become impossible to attain the favorable optical performance.

The condition (2) is established for regulating the zooming ratio shared by the third lens group during the zooming operation from the wide-angle position to the telephoto position. When the upper limit of this condition is exceeded, the zooming range of the third lens group will become larger than that required and the moving amount of the third lens group itself during the zooming operation will become large. Therefore, while the load of magnification shared by the lens groups other than the third lens group will decrease and the reason for the employment of the three groups-type zooming system will become obscure, the total length of the zoom lens system will become too large to satisfy the requirement of compactness, and the compensation for the flatness of the image surface will become impossible. When the lower limit of the condition (2) is exceeded, the load of a zooming ratio shared by the second lens group will become large so that it will be necessary to enlarge the moving amount of the second lens group or enlarge the refracting power thereof. In the case of the enlargement of the moving amount of the second lens group, the total length of the zoom lens system will become large especially in the wide-angle position, which is contrary to the object of the present invention. In the case of the enlargement of the refracting power of the second lens group, the residual amounts of aberrations will become large and the balance among various aberrations will become unfavorable, so that it will become impossible to correct aberrations favorable even though a graded refractive index lens of an axial type is used.

In the zoom lens system having the above-mentioned arrangement of the refracting powers, the second lens group can be divided into a front lens group and a rear lens group with a diaphragm disposed therebetween. In this case, it is desirable for the refracting powers of these front lens group and rear lens group to satisfy the following condition (3):

$$0.3 < |f_{22}/f_{21}| < 1.5 \quad (3)$$

wherein reference symbol $f_{21}$ represents the focal length of the front lens group of the second lens group and reference symbol $f_{22}$ represents the focal length of the rear lens group thereof.

The condition (3) is established for regulating the refracting powers of the front lens group and the rear lens group of the second lens group in order to maintain the fluctuation of aberrations generated in the second lens group during the zooming operation to be small.

When the lower limit of the condition (3) is exceeded, the positive refracting power of the rear lens group thereof will become strong so that distortion will deteriorate in the wide-angle position, or the negative refracting power of the front lens group thereof will become weak so that coma generated in the first lens group at the telephoto range cannot be corrected. When the upper limit of the condition (3) is exceeded, the positive refracting power of the rear lens group thereof will become weak or the negative refracting power of the front lens group will become strong so that, in neither cases, coma generated in the second lens group can be corrected completely by means of the other lens groups.

The distribution of the refractive index in the graded refractive index lens of an axial type used in the zoom lens system according to the present invention is expressed by the following formula:

$$n(x) = n_0 + n_1 x + n_2 x^2 + n_3 x^3 + \ldots$$

wherein reference symbol x represents the distance in the optical direction from the origin which is set on the vertex of the object side surface of the graded refractive index lens, reference symbol $n_0$ represents the refractive index at the vertex of the object side surface of the graded refractive index lens and reference symbols $n_1, n_2, n_3, \ldots$ respectively represent the 1st-, 2nd-, 3rd-, ... order coefficients relating to x.

It is desirable for the graded refractive index lens used in the zoom lens system according to the present invention to satisfy the following conditions (4) and (5):

$$\Delta n_A < 0.15 \quad (4)$$

$$|n_1 \cdot f_W| < 3.0 \quad (5)$$

wherein reference symbol $\Delta n_A$ represents the maximum difference of the refractive index on the optical axis from the object side surface of the graded refractive index lens to the image side surface thereof.

Presently, as a manufacturing process of a graded refractive index lens, various processes such as an ion-exchange process, a molecular stuffing process, etc., have been proposed, but the maximum difference of the refractive index produced thereby is not very large.

The condition (4) is established in view of the above. When this condition is not satisfied, it will be extremely difficult to manufacture the graded refractive index lens.

The condition (5) is established for regulating the degree of the gradient of the refractive index. When this condition is not satisfied, in order to satisfy the condition (4), it will be necessary to set such higher-order coefficients as $n_2, n_3, \ldots$ to be larger, which results in an increase in the generation of higher-order aberrations.

DETAILED DESCRIPTION OF THE PREFERRED EMBODIMENTS

Preferred embodiments of the zoom lens system according to the present invention explained in the above are as shown below.

Embodiment 1

$f = 39.49 - 100.53$, F/4.60-5.90

$r_1 = 8331.050$
  $d_1 = 1.500$  $n_{01} = 1.80518$  $\nu_{01} = 25.43$
$r_2 = 19.240$
  $d_2 = 4.548$  $n_{02}$ Graded Refractive Index Lens
$r_3 = 140.928$
  $d_3 = 0.049$
$r_4 = 25.392$
  $d_4 = 3.894$  $n_{03} = 1.54072$  $\nu_{03} = 47.20$
$r_5 = -125.502$
  $d_5 = D1$ (variable)
$r_6 = -39.854$
  $d_6 = 1.235$  $n_{04} = 1.77250$  $\nu_{04} = 49.66$
$r_7 = 16.677$
  $d_7 = 1.867$
$r_8 = 30.625$
  $d_8 = 3.000$  $n_{05} = 1.80518$  $\nu_{05} = 25.43$
$r_9 = -30.160$
  $d_9 = 1.102$
$r_{10} = -26.204$
  $d_{10} = 1.193$  $n_{06} = 1.80440$  $\nu_{06} = 39.58$
$r_{11} = -105.340$
  $d_{11} = 5.900$
$r_{12} = \infty$ (diaphragm)
  $d_{12} = 2.123$
$r_{13} = 232.415$
  $d_{13} = 3.500$  $n_{07} = 1.54771$  $\nu_{07} = 62.83$
$r_{14} = -18.611$
  $d_{14} = 0.060$
$r_{15} = 31.073$
  $d_{15} = 4.391$  $n_{08} = 1.56965$  $\nu_{08} = 49.33$
$r_{16} = -44.022$
  $d_{16} = 0.750$
$r_{17} = -23.523$
  $d_{17} = 2.599$  $n_{09} = 1.84666$  $\nu_{09} = 23.88$
$r_{18} = 30.171$
  $d_{18} = 2.860$
$r_{19} = 58.530$
  $d_{19} = 3.200$  $n_{010} = 1.60342$  $\nu_{010} = 38.01$
$r_{20} = -20.126$
  $d_{20} = D2$ (variable)
$r_{21} = -26.741$
  $d_{21} = 2.800$  $n_{011} = 1.78472$  $\nu_{011} = 25.68$
$r_{22} = -17.489$
  $d_{22} = 1.902$
$r_{23} = -17.166$
  $d_{23} = 1.750$  $n_{012} = 1.77250$  $\nu_{012} = 49.66$
$r_{24} = 117.152$

| f | 39.49 | 63.08 | 100.53 |
|---|---|---|---|
| D1 | 1.251 | 7.865 | 11.909 |
| D2 | 17.796 | 10.257 | 4.679 |

$n(x) = n_0 + n_1 x + n_2 x^2 + n_3 x^3$

| n(x) | | $n_0$ | $n_1$ |
|---|---|---|---|
| | d | 1.69957 | $-0.22036 \times 10^{-3}$ |
| | g | 1.72998 | $-0.23386 \times 10^{-3}$ |

| | | $n_2$ | $n_3$ |
|---|---|---|---|
| | d | $-0.27717 \times 10^{-4}$ | $0.10158 \times 10^{-4}$ |
| | g | $-0.29993 \times 10^{-4}$ | $0.10992 \times 10^{-4}$ |

$|f_3/f_W| = 0.727$  $\beta_{3T}/\beta_{3W} = 2.1460$
$|f_{22}/f_{21}| = 0.823$  $\Delta n_A = 0.0006$
$|n_1 \cdot f_W| = 0.0087$

Embodiment 2

$f = 39.52 - 100.80$, F/4.66-6.38

$r_1 = 348.884$
  $d_1 = 1.500$  $n_{01} = 1.84666$  $\nu_{02} = 23.88$
$r_2 = 45.104$
  $d_2 = 0.880$
$r_3 = 68.824$
  $d_3 = 3.479$  $n_{02} = 1.65100$  $\nu_{02} = 56.15$
$r_4 = 451.324$
  $d_4 = 0.200$
$r_5 = 35.144$
  $d_5 = 4.500$  $n_{03} = 1.51602$  $\nu_{03} = 56.80$
$r_6 = -61.676$
  $d_6 = D1$ (variable)
$r_7 = -40.245$
  $d_7 = 1.300$  $n_{04} = 1.72916$  $\nu_{04} = 54.68$
$r_8 = 22.905$
  $d_8 = 0.800$
$r_9 = 23.093$
  $d_9 = 2.506$  $n_{05} = 1.80518$  $\nu_{05} = 25.43$
$r_{10} = 366.246$
  $d_{10} = 1.900$
$r_{11} = -23.252$
  $d_{11} = 1.300$  $n_{06} = 1.77250$  $\nu_{06} = 49.66$
$r_{12} = -30.419$
  $d_{12} = 8.863$
$r_{13} = \infty$ (diaphragm)
  $d_{13} = 1.913$
$r_{14} = -85.767$
  $d_{14} = 2.800$  $n_{07} = 1.61293$  $\nu_{07} = 37.00$
$r_{15} = -26.666$
  $d_{15} = 0.100$
$r_{16} = 28.014$
  $d_{16} = 3.285$  $n_{08} = 1.58913$  $\nu_{08} = 60.97$
$r_{17} = -33.501$
  $d_{17} = 1.159$
$r_{18} = -20.032$
  $d_{18} = 1.618$  $n_{09}$ Graded Refractive Index Lens
$r_{19} = 36.370$
  $d_{19} = 2.362$
$r_{20} = 62.364$
  $d_{20} = 3.286$  $n_{010} = 1.56873$  $\nu_{010} = 63.16$
$r_{21} = -20.778$
  $d_{21} = D2$ (variable)
$r_{22} = -33.699$
  $d_{22} = 3.297$  $n_{011} = 1.78472$  $\nu_{011} = 25.68$
$r_{23} = -18.888$
  $d_{23} = 2.207$
$r_{24} = -17.065$
  $d_{24} = 1.601$  $n_{012} = 1.78590$  $\nu_{012} = 44.18$
$r_{25} = 102.469$

| f | 39.52 | 63.11 | 100.80 |
|---|---|---|---|
| D1 | 2.037 | 5.521 | 9.611 |
| D2 | 16.310 | 8.204 | 2.500 |

$n(x) = n_0 + n_1 x$

| n(x) | | $n_0$ | $n_1$ |
|---|---|---|---|
| | d | 1.70545 | $-0.5 \times 10^{-2}$ |
| | g | 1.73626 | $-0.533 \times 10^{-2}$ |

$|f_3/f_W| = 0.749$  $\beta_{3T}/\beta_{3W} = 2.2699$
$|f_{22}/f_{21}| = 0.650$  $\Delta n_A = 0.0081$ -continued

Embodiment 2

$|n_1 \cdot f_W| = 0.1976$

---

Embodiment 3

$f = 39.58-100.54 \quad F/4.66-6.38$

| | | | |
|---|---|---|---|
| $r_1 = 348.884$ | | | |
| | $d_1 = 1.500$ | $n_{01} = 1.83400$ | $\nu_{01} = 37.16$ |
| $r_2 = 35.222$ | | | |
| | $d_2 = 1.100$ | | |
| $r_3 = 73.527$ | | | |
| | $d_3 = 3.479$ | $n_{02} = 1.65844$ | $\nu_{02} = 50.86$ |
| $r_4 = 4200.209$ | | | |
| | $d_4 = 0.200$ | | |
| $r_5 = 26.196$ | | | |
| | $d_5 = 5.200$ | $n_{03} = 1.51821$ | $\nu_{03} = 65.04$ |
| $r_6 = -75.680$ | | | |
| | $d_6 = D1$ (variable) | | |
| $r_7 = -32.768$ | | | |
| | $d_7 = 1.300$ | $n_{04} = 1.78590$ | $\nu_{04} = 44.18$ |
| $r_8 = 18.248$ | | | |
| | $d_8 = 0.800$ | | |
| $r_9 = 21.741$ | | | |
| | $d_9 = 2.506$ | $n_{05} = 1.80518$ | $\nu_{05} = 25.43$ |
| $r_{10} = -908.077$ | | | |
| | $d_{10} = 9.823$ | | |
| $r_{11} = \infty$ (diaphragm) | | | |
| | $d_{11} = 1.913$ | | |
| $r_{12} = -132.304$ | | | |
| | $d_{12} = 2.800$ | $n_{06} = 1.61484$ | $\nu_{06} = 51.17$ |
| $r_{13} = -26.305$ | | | |
| | $d_{13} = 0.100$ | | |
| $r_{14} = 28.521$ | | | |
| | $d_{14} = 4.000$ | $n_{07} = 1.58913$ | $\nu_{07} = 60.97$ |
| $r_{15} = -27.839$ | | | |
| | $d_{15} = 1.159$ | | |
| $r_{16} = -20.897$ | | | |
| | $d_{16} = 1.618$ | $n_{08}$ Graded Refractive Index Lens | |
| $r_{17} = 39.246$ | | | |
| | $d_{17} = 2.362$ | | |
| $r_{18} = 178.074$ | | | |
| | $d_{18} = 3.286$ | $n_{09} = 1.57135$ | $\nu_{09} = 52.92$ |
| $r_{19} = -21.364$ | | | |
| | $d_{19} = D2$ (variable) | | |
| $r_{20} = -35.509$ | | | |
| | $d_{20} = 3.297$ | $n_{010} = 1.78472$ | $\nu_{010} = 25.68$ |
| $r_{21} = -18.181$ | | | |
| | $d_{21} = 1.507$ | | |
| $r_{22} = -17.065$ | | | |
| | $d_{22} = 1.601$ | $n_{011} = 1.78650$ | $\nu_{011} = 50.00$ |
| $r_{23} = 124.801$ | | | |

| f | 39.58 | 63.11 | 100.54 |
|---|---|---|---|
| D1 | 2.500 | 6.889 | 11.083 |
| D2 | 18.382 | 9.092 | 2.500 |

$n(x) = n_0 + n_1 x$

| n(x) | | $n_0$ | $n_1$ |
|---|---|---|---|
| | d | 1.74077 | $-0.5 \times 10^{-2}$ |
| | g | 1.77589 | $-0.533 \times 10^{-2}$ |

$|f_3/f_W| = 0.841 \qquad \beta_{3T}/\beta_{3W} = 2.2376$
$|f_{22}/f_{21}| = 0.745 \qquad \Delta n_A = 0.0081$
$|n_1 \cdot f_W| = 0.1979$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_{01}, n_{02}, \ldots$ respectively represent refractive indices of respective lenses and reference symbols $\nu_{01}, \nu_{02}, \ldots$ respectively represent Abbe's numbers of respective lenses. And, the coefficients of the refractive index distribution are for d- and g-rays.

Figure 1:
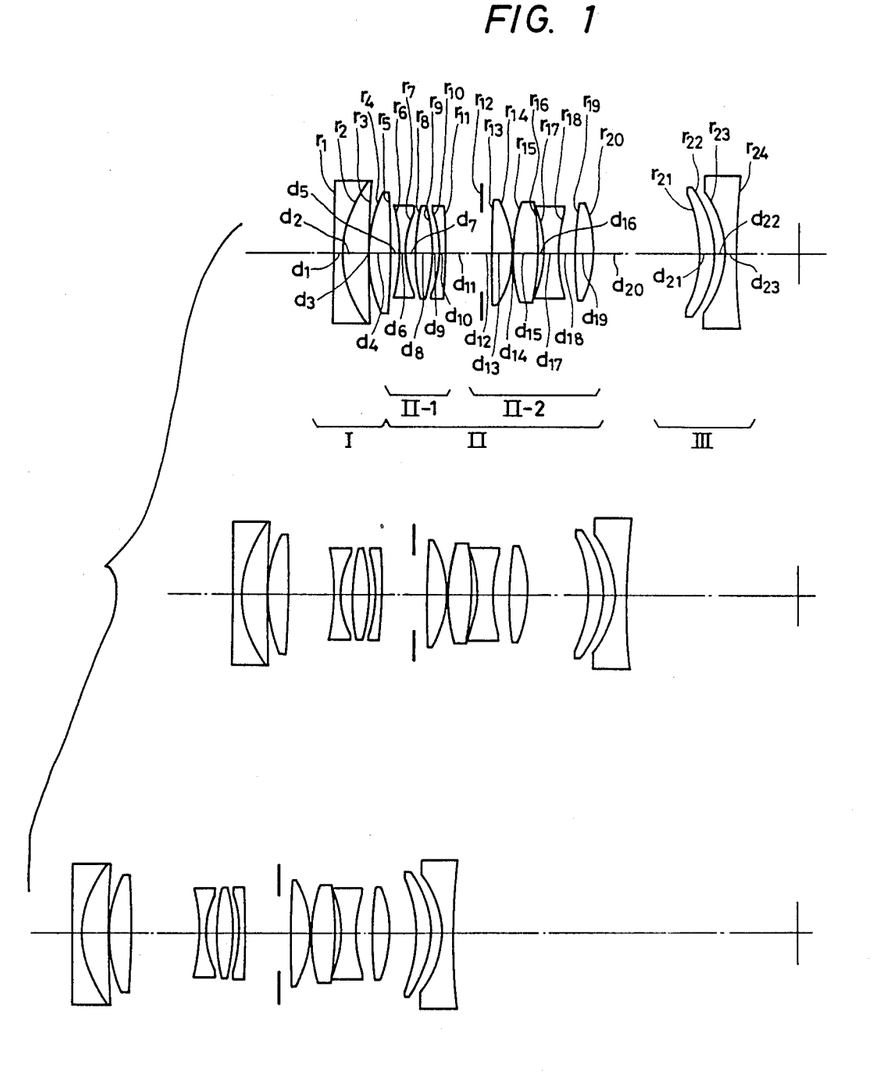
FIGS. 1 through 3 show schematic sectional views of Embodiments 1 through 3 of the zoom lens system according to the present invention.
Figure 2:
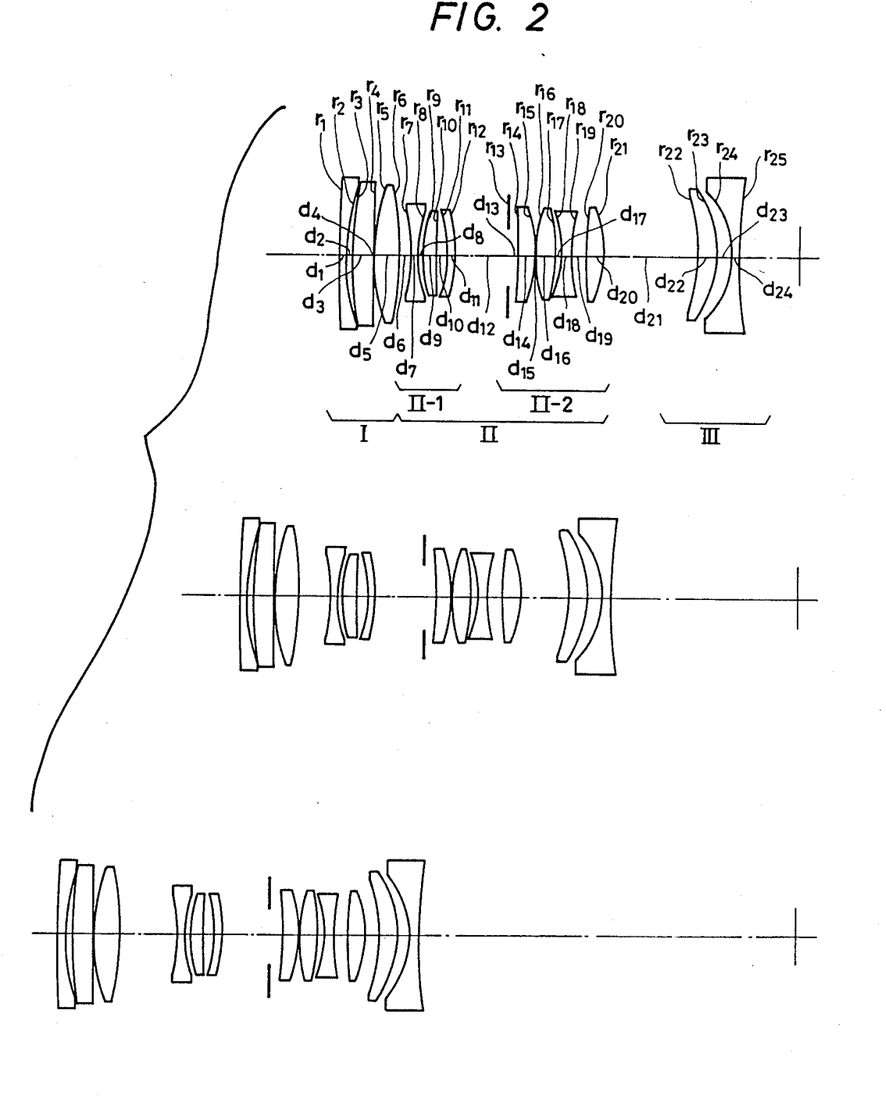
Figure 3:
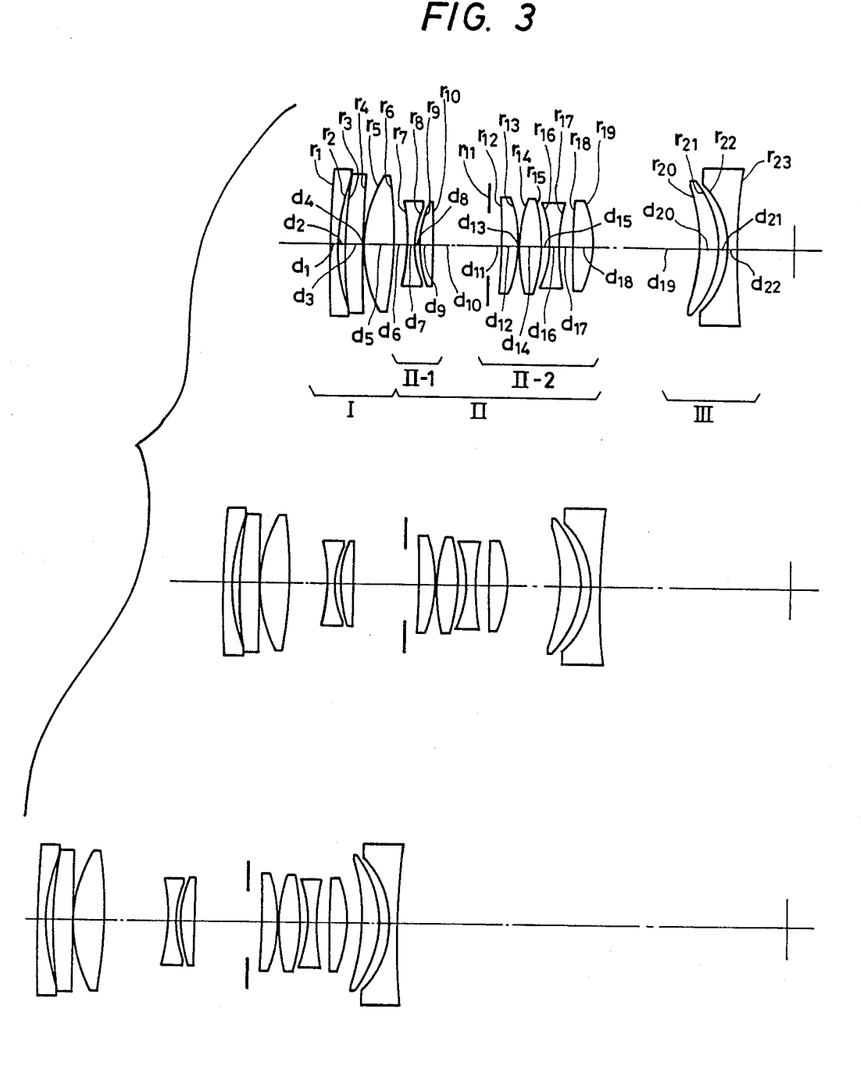

The lens configurations of above-mentioned embodiments of the zoom lens system according to the present invention are shown in FIGS. 1 through 3. In those figures, a first lens group I comprises a doublet cemented with a negative lens and a positive lens or these lenses separated from each other and a positive lens, a second lens group II comprises a front lens group II-1 involving at least a negative lens and a positive lens and a rear lens group II-2 having two positive lenses, a negative lens and a positive lens, and the third lens group III comprises a positive meniscus lens and a negative lens.

Figure 4:
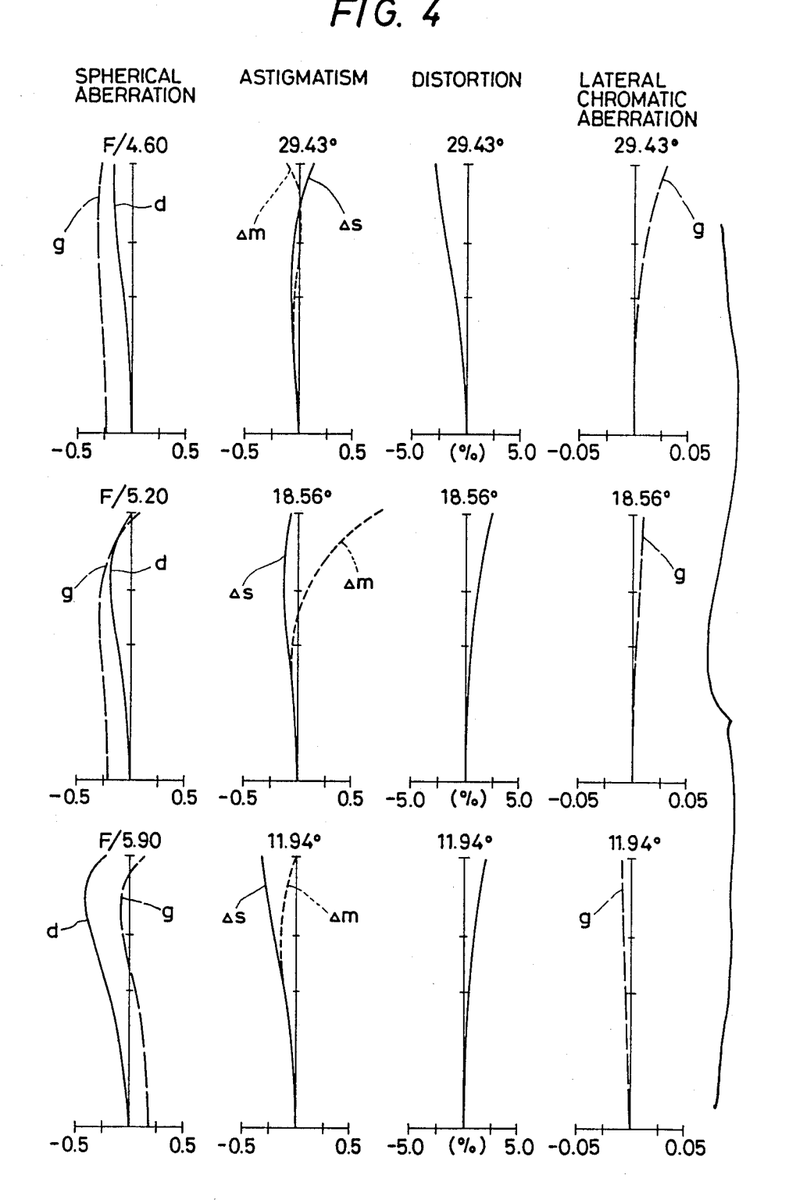
FIGS. 4 through 6 show graphs illustrating aberration curves of Embodiments 1 through 3 of the zoom lens system according to the present invention.

Among embodiments as mentioned in the above, in the lens configuration of Embodiment 1 of the zoom lens system according to the present invention as shown in FIG. 1, the second lens from the object side (the image side lens of the doublet) of the first lens group I is a graded refractive index lens of an axial type. In this embodiment, the graded refractive index lens has the distribution of the refractive index in which the refractive index decreases in the direction of the optical axis from the object side surface thereof, and the refracting amount is controlled in the cemented surface between this lens and the first lens (the object lens of the doublet) according to the height of the light ray to thereby correct, especially, astigmatism in the wide-angle position and correct spherical aberration and astigmatism in the telephoto position. The aberration curves of this Embodiment are as shown in FIG. 4.

Figure 5:
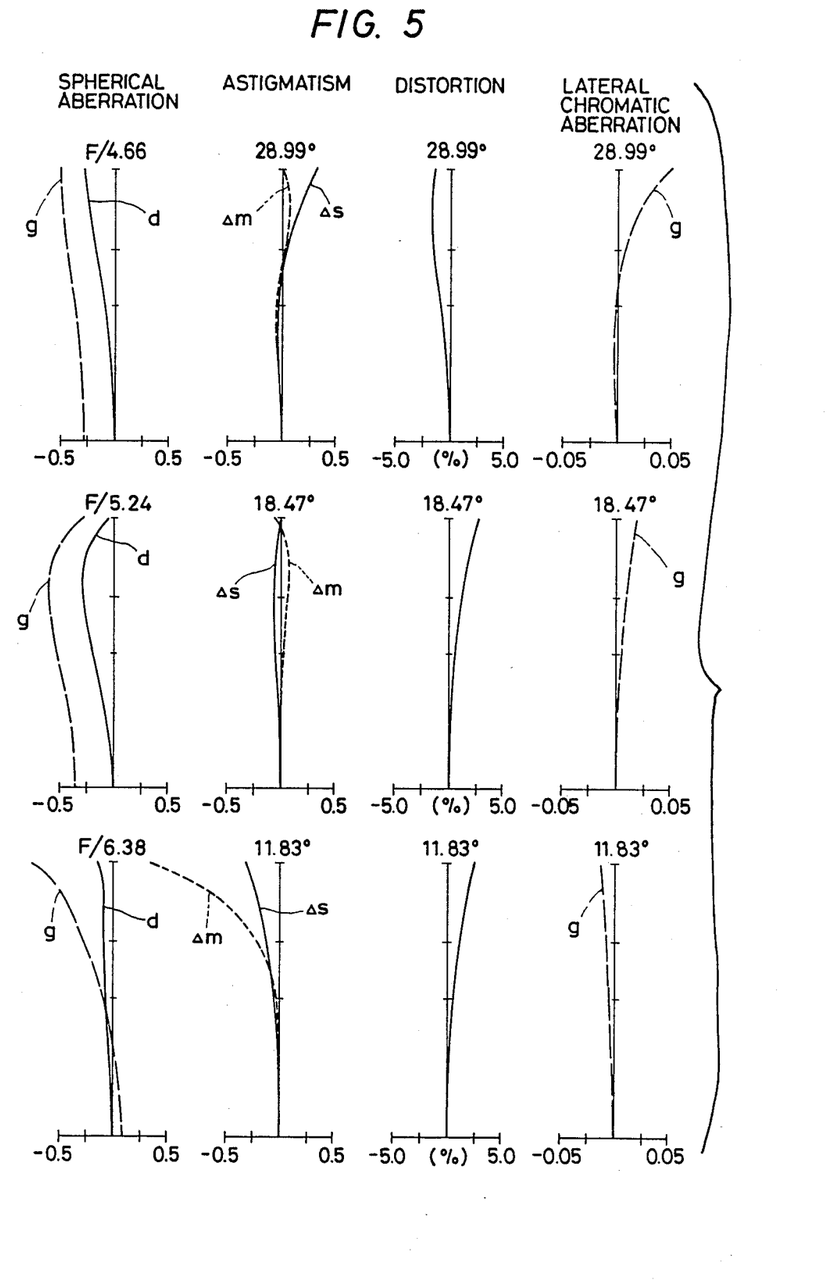
Figure 6:
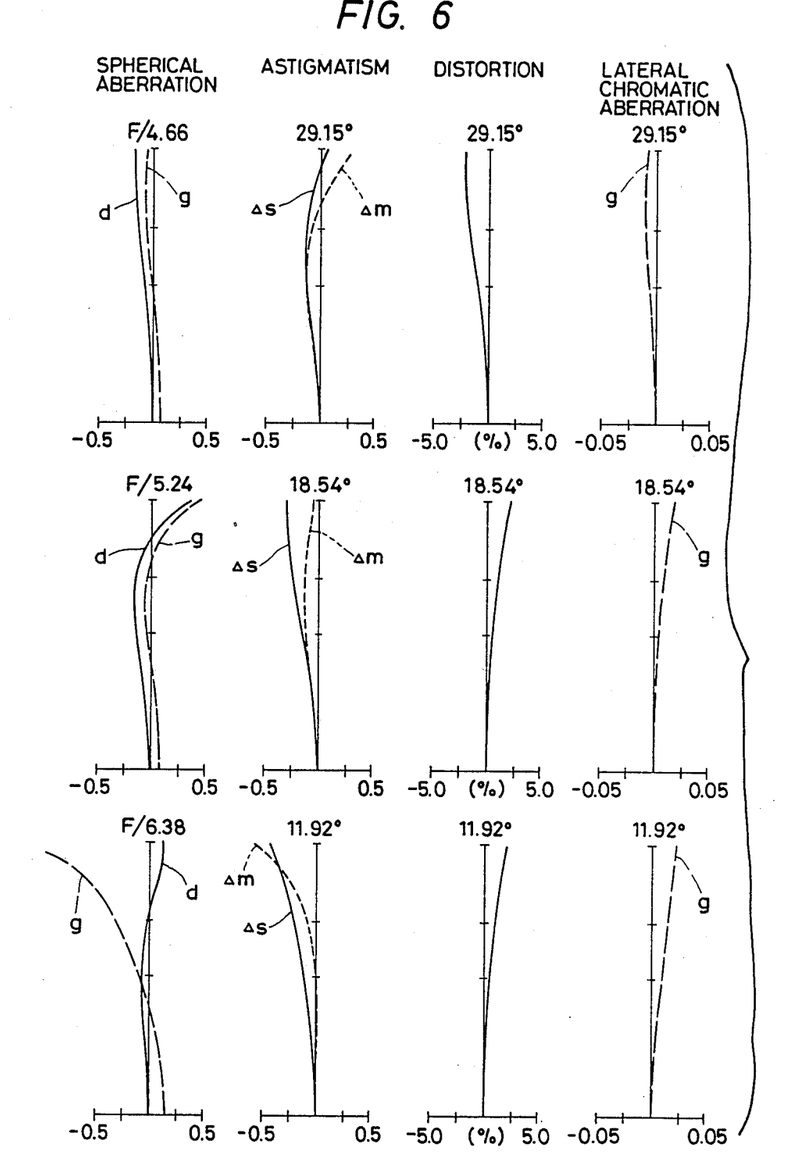

In the lens configuration of Embodiment 2 of the zoom lens system according to the present invention as shown in FIG. 2, the negative lens of the rear lens group II-2 in the second lens group II is a graded refractive index lens of an axial type. This graded refractive index lens has the distribution of the refractive index in which the refractive index decreases from the object side to the image side so that the refractive index on the object side refracting surface thereof increases in proportion to the increase in the height of ray incident to that surface to thereby provide the larger diverging effect thereto, which enables to correct spherical aberration and coma in both the wide-angle position and the telephoto position. The aberration curves of this embodiment are as shown in FIG. 5.

The lens configuration of Embodiment 3 of the zoom lens system according to the present invention is as shown in FIG. 3. In this embodiment, as in the case of Embodiment 2, the negative lens of the rear lens group II-2 in the second lens group II is a graded refractive index lens of an axial type having the distribution of the refractive index in which the refractive index decreases from the object side to the image side. Because of this, spherical aberration and coma in both the wide-angle position and the telephoto position are corrected.

In the zoom lens system according to the present invention, the graded refractive index lens is used as a lens component of the lens system so that the 3rd-order coefficients of aberrations are expressed by the following formula:

$$\sigma = \sum_i \sigma_S^{(i)} + \sum_i \sigma_{HS}^{(i)} \sum_i \sigma_{HT}^{(i)}$$

wherein reference symbol $\sigma_S^{(i)}$ represents the amount of the aberrations generated in the i surface in the case of the employment of the homogeneous optical material having the refractive index of the vertex of the lens surface, reference symbol $\sigma_{HS}^{(i)}$ represents the aberration correcting term relating to the change of the refracting amount generated by the change of the refractive index on the i surface caused by the employment of a graded refractive index lens and reference symbol $\sigma_{HT}^{(i)}$ represents the amount of the aberration generated by a ray tracing curve during the propagation of the ray from the i surface to the (i+1) surface caused by the employment of the graded refractive index lens.

As is explained in detail in the above, the zoom lens system according to the present invention comprises three lens groups so that the number of lens components of the zoom lens becomes small and it is possible to simplify the structure of the zooming mechanism. Moreover, in the zoom lens system according to the present invention, it is possible to control aberrations generated in the respective lens groups to be small while maintaining a high zooming ratio so that the fluctuation of aberrations during the zooming operation becomes small. Besides, because the graded refractive index lens is used efficiently, it is possible to maintain an excellent flatness of the image surface. As shown in the above, according to the present invention, it is possible to obtain a compact zoom lens system having a favorable optical performance.

We claim:

1. A compact zoom lens system with a high zooming ratio comprising, in order from the object side, a first lens group having a positive refracting power, a second lens group having a positive refracting power and a third lens group having a negative refracting power, and being arranged to be zoomed by varying the space between said first lens group and said second lens group and the space between said second lens group and said third lens group, in which at least one graded refractive index lens having the distribution of the refractive index thereof in the direction of the optical axis is arranged in at least one lens group.

2. A compact zoom lens system with a high zooming ratio according to claim 1, in which said third lens group satisfies the following conditions (1) and (2):

$$0.4 < |f_3/f_W| < 2 \quad (1)$$

$$1 < \beta_{3T}/\beta_{3W} < 3 \quad (2)$$

wherein reference symbol $f_W$ represents the focal length of said zoom lens system as a whole in the wide-angle position, reference symbol $f_3$ represents the focal length of said third lens group, reference symbol $\beta_{3W}$ represents the lateral magnification of said third lens group in the wide-angle position, reference symbol $\beta_{3T}$ represents the lateral magnification of said third lens group in the telephoto position.

3. A compact zoom lens system with a high zooming ratio according to claim 1 or 2, in which said second lens group comprises a front lens group and a rear lens group, and the refracting powers of said front lens group and said rear lens group satisfy the following condition (3):

$$0.3 < |f_{22}/f_{21}| < 1.5 \quad (3)$$

wherein reference symbol $f_{21}$ represents the focal length of said front lens group of said second lens group and reference symbol $f_{22}$ represents the focal length of said rear lens group of said second lens group.

4. A compact zoom lens system with a high zooming ratio according to claim 3, in which said graded refractive index lens has the distribution of the refractive index expressed by the following formula:

$$n(x) = n_0 + n_1 x + n_2 x^2 + n_3 x^3 + \ldots$$

wherein reference symbol x represents the distance in the optical direction from the origin which is set on the vertex of the object side surface of said graded refractive index lens, reference symbol $n_0$ represents the refractive index at the vertex of the object side surface of said graded refractive index lens and reference symbols $n_1, n_2, n_3, \ldots$ respectively represent the 1st-, 2nd-, 3rd-, ... order coefficients relating to x.

5. A compact zoom lens system with a high zooming ratio according to claim 4, in which said graded refractive index lens satisfies the following conditions (4) and (5):

$$\Delta n_A < 0.15 \quad (4)$$

$$|n_1 \cdot f_W| < 3.0 \quad (5)$$

wherein reference symbol $\Delta n_A$ represents the maximum difference of the refractive index on the optical axis from the object side surface of said graded refractive index lens to the image side surface thereof and reference symbol $f_W$ represents the focal length of said zoom lens system as a whole in the wide-angle position.

6. A compact zoom lens system with a high zooming ratio according to claim 5, in which said first lens group comprises a doublet cemented with a negative lens and a positive lens, and a positive lens, said second lens group comprises said front lens group involving at least a negative lens and a positive lens and said rear lens group having two positive lenses, a negative lens and a positive lens, and said third lens group comprises a positive meniscus lens and a negative lens.

7. A compact zoom lens system with a high zooming ratio according to claim 5, in which said first lens group comprises a negative lens, a positive lens and a positive lens, said second lens group comprises said front lens group involving at least a negative lens and a positive lens and said rear lens group having two positive lenses, a negative lens and a positive lens, and said third lens group comprises a positive meniscus lens and a negative lens.

8. A compact zoom lens system with a high zooming ratio according to claim 6, in which said compact zoom lens system with a high zooming ratio has the following numerical data:

| f = 39.49–100.53, F/4.60–5.90 | | | |
|---|---|---|---|
| $r_1 = 8331.050$ | | | |
| | $d_1 = 1.500$ | $n_{01} = 1.80518$ | $\nu_{01} = 25.43$ |
| $r_2 = 19.240$ | | | |
| | $d_2 = 4.548$ | $n_{02}$ Graded Refractive Index Lens | |
| $r_3 = 140.928$ | | | |
| | $d_3 = 0.049$ | | |
| $r_4 = 25.392$ | | | |
| | $d_4 = 3.894$ | $n_{03} = 1.54072$ | $\nu_{03} = 47.20$ |
| $r_5 = -125.502$ | | | |
| | $d_5 = D1$ (variable) | | |
| $r_6 = -39.854$ | | | |
| | $d_6 = 1.235$ | $n_{04} = 1.77250$ | $\nu_{04} = 49.66$ |
| $r_7 = 16.677$ | | | |
| | $d_7 = 1.867$ | | |
| $r_8 = 30.625$ | | | |
| | $d_8 = 3.000$ | $n_{05} = 1.80518$ | $\nu_{05} = 25.43$ |
| $r_9 = -30.160$ | | | |
| | $d_9 = 1.102$ | | |

-continued

| \multicolumn{5}{c}{$f = 39.49\text{-}100.53, \quad F/4.60\text{-}5.90$} |
|---|---|---|---|---|
| $r_{10} = -26.204$ | | | | |
| | $d_{10} = 1.193$ | $n_{06} = 1.80440$ | | $\nu_{06} = 39.58$ |
| $r_{11} = -105.340$ | | | | |
| | $d_{11} = 5.900$ | | | |
| $r_{12} = \infty$ (diaphragm) | | | | |
| | $d_{12} = 2.123$ | | | |
| $r_{13} = 232.415$ | | | | |
| | $d_{13} = 3.500$ | $n_{07} = 1.54771$ | | $\nu_{07} = 62.83$ |
| $r_{14} = -18.611$ | | | | |
| | $d_{14} = 0.060$ | | | |
| $r_{15} = 31.073$ | | | | |
| | $d_{15} = 4.391$ | $n_{08} = 1.56965$ | | $\nu_{08} = 49.33$ |
| $r_{16} = -44.022$ | | | | |
| | $d_{16} = 0.750$ | | | |
| $r_{17} = -23.523$ | | | | |
| | $d_{17} = 2.599$ | $n_{09} = 1.84666$ | | $\nu_{09} = 23.88$ |
| $r_{18} = 30.171$ | | | | |
| | $d_{18} = 2.860$ | | | |
| $r_{19} = 58.530$ | | | | |
| | $d_{19} = 3.200$ | $n_{010} = 1.60342$ | | $\nu_{010} = 38.01$ |
| $r_{20} = -20.126$ | | | | |
| | $d_{20} = D2$ (variable) | | | |
| $r_{21} = -26.741$ | | | | |
| | $d_{21} = 2.800$ | $n_{011} = 1.78472$ | | $\nu_{011} = 25.68$ |
| $r_{22} = -17.489$ | | | | |
| | $d_{22} = 1.902$ | | | |
| $r_{23} = -17.166$ | | | | |
| | $d_{23} = 1.750$ | $n_{012} = 1.77250$ | | $\nu_{012} = 49.66$ |
| $r_{24} = 117.152$ | | | | |

| f | 39.49 | 63.08 | 100.53 |
|---|---|---|---|
| D1 | 1.251 | 7.865 | 11.909 |
| D2 | 17.796 | 10.257 | 4.679 |

| \multicolumn{3}{c}{$n(x) = n_0 + n_1 x + n_2 x^2 + n_3 x^3$} |
|---|---|---|
| | $n_0$ | $n_1$ |
| $n(x)$ d | 1.69957 | $-0.22036 \times 10^{-3}$ |
| g | 1.72998 | $-0.23386 \times 10^{-3}$ |
| | $n_2$ | $n_3$ |
| d | $-0.27717 \times 10^{-4}$ | $0.10158 \times 10^{-4}$ |
| g | $-0.29993 \times 10^{-4}$ | $0.10992 \times 10^{-4}$ |

$|f_3/f_W| = 0.727 \quad \beta_{3T}/\beta_{3W} = 2.1460$
$|f_{22}/f_{21}| = 0.823 \quad \Delta n_A = 0.0006$
$|n_1 \cdot f_W| = 0.0087$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_{01}, n_{02}, \ldots$ respectively represent refractive indices of respective lenses, reference symbols $\nu_{01}, \nu_{02}, \ldots$ respectively represent Abbe's numbers of respective lenses, and the coefficients of the refractive index distribution are for d- and g-rays.

9. A compact zoom lens system with a high zooming ratio according to claim 7, in which said compact zoom lens system with a high zooming ratio has the following numerical data:

| \multicolumn{5}{c}{$f = 39.52\text{-}100.80, \quad F/4.66\text{-}6.38$} |
|---|---|---|---|---|
| $r_1 = 348.884$ | | | | |
| | $d_1 = 1.500$ | $n_{01} = 1.84666$ | | $\nu_{01} = 23.88$ |
| $r_2 = 45.104$ | | | | |
| | $d_2 = 0.880$ | | | |
| $r_3 = 68.824$ | | | | |
| | $d_3 = 3.479$ | $n_{02} = 1.65100$ | | $\nu_{02} = 56.15$ |
| $r_4 = 451.324$ | | | | |
| | $d_4 = 0.200$ | | | |
| $r_5 = 35.144$ | | | | |
| | $d_5 = 4.500$ | $n_{03} = 1.51602$ | | $\nu_{03} = 56.80$ |
| $r_6 = -61.676$ | | | | |
| | $d_6 = D1$ (variable) | | | |

-continued

| \multicolumn{5}{c}{$f = 39.52\text{-}100.80, \quad F/4.66\text{-}6.38$} |
|---|---|---|---|---|
| $r_7 = -40.245$ | | | | |
| | $d_7 = 1.300$ | $n_{04} = 1.72916$ | | $\nu_{04} = 54.68$ |
| $r_8 = 22.905$ | | | | |
| | $d_8 = 0.800$ | | | |
| $r_9 = 23.093$ | | | | |
| | $d_9 = 2.506$ | $n_{05} = 1.80518$ | | $\nu_{05} = 25.43$ |
| $r_{10} = 366.246$ | | | | |
| | $d_{10} = 1.900$ | | | |
| $r_{11} = -23.252$ | | | | |
| | $d_{11} = 1.300$ | $n_{06} = 1.77250$ | | $\nu_{06} = 49.66$ |
| $r_{12} = -30.419$ | | | | |
| | $d_{12} = 8.863$ | | | |
| $r_{13} = \infty$ (diaphragm) | | | | |
| | $d_{13} = 1.913$ | | | |
| $r_{14} = -85.767$ | | | | |
| | $d_{14} = 2.800$ | $n_{07} = 1.61293$ | | $\nu_{07} = 37.00$ |
| $r_{15} = -26.666$ | | | | |
| | $d_{15} = 0.100$ | | | |
| $r_{16} = 28.014$ | | | | |
| | $d_{16} = 3.285$ | $n_{08} = 1.58913$ | | $\nu_{08} = 60.97$ |
| $r_{17} = -33.501$ | | | | |
| | $d_{17} = 1.159$ | | | |
| $r_{18} = -20.032$ | | | | |
| | $d_{18} = 1.618$ | $n_{09}$ Graded Refractive Index Lens | | |
| $r_{19} = 36.370$ | | | | |
| | $d_{19} = 2.362$ | | | |
| $r_{20} = 62.364$ | | | | |
| | $d_{20} = 3.286$ | $n_{010} = 1.56873$ | | $\nu_{010} = 63.16$ |
| $r_{21} = -20.778$ | | | | |
| | $d_{21} = D2$ (variable) | | | |
| $r_{22} = -33.699$ | | | | |
| | $d_{22} = 3.297$ | $n_{011} = 1.78472$ | | $\nu_{011} = 25.68$ |
| $r_{23} = -18.888$ | | | | |
| | $d_{23} = 2.207$ | | | |
| $r_{24} = -17.065$ | | | | |
| | $d_{24} = 1.601$ | $n_{012} = 1.78590$ | | $\nu_{012} = 44.18$ |
| $r_{25} = 102.469$ | | | | |

| f | 39.52 | 63.11 | 100.80 |
|---|---|---|---|
| D1 | 2.037 | 5.521 | 9.611 |
| D2 | 16.310 | 8.204 | 2.500 |

| \multicolumn{3}{c}{$n(x) = n_0 + n_1 x$} |
|---|---|---|
| | $n_0$ | $n_1$ |
| $n(x)$ d | 1.70545 | $-0.5 \times 10^{-2}$ |
| g | 1.73626 | $-0.533 \times 10^{-2}$ |

$|f_3/f_W| = 0.749 \quad \beta_{3T}/\beta_{3W} = 2.2699$
$|f_{22}/f_{21}| = 0.650 \quad \Delta n_A = 0.0081$
$|n_1 \cdot f_W| = 0.1976$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_{01}, n_{02}, \ldots$ respectively represent refractive indices of respective lenses reference symbols $\nu_{01}, \nu_{02}, \ldots$ respectively represent Abbe's numbers of respective lenses, and the coefficients of the refractive index distribution are for d- and g-rays.

10. A compact zoom lens system with a high zooming ratio according to claim 7, in which said compact zoom lens system with a high zooming ratio has the following numerical data:

| \multicolumn{5}{c}{$f = 39.58\text{-}100.54, \quad F/4.66\text{-}6.38$} |
|---|---|---|---|---|
| $r_1 = 348.884$ | | | | |
| | $d_1 = 1.500$ | $n_{01} = 1.83400$ | | $\nu_{01} = 37.16$ |
| $r_2 = 35.222$ | | | | |
| | $d_2 = 1.100$ | | | |
| $r_3 = 73.527$ | | | | |
| | $d_3 = 3.479$ | $n_{02} = 1.65844$ | | $\nu_{02} = 50.86$ |
| $r_4 = 4200.209$ | | | | |
| | $d_4 = 0.200$ | | | |

-continued $f = 39.58-100.54, \quad F/4.66-6.38$

| | | |
|---|---|---|
| $r_5 = 26.196$ | | |
| | $d_5 = 5.200 \quad n_{03} = 1.51821$ | $\nu_{03} = 65.04$ |
| $r_6 = -75.680$ | | |
| | $d_6 = D1$ (variable) | |
| $r_7 = -32.768$ | | |
| | $d_7 = 1.300 \quad n_{04} = 1.78590$ | $\nu_{04} = 44.18$ |
| $r_8 = 18.248$ | | |
| | $d_8 = 0.800$ | |
| $r_9 = 21.741$ | | |
| | $d_9 = 2.506 \quad n_{05} = 1.80518$ | $\nu_{05} = 25.43$ |
| $r_{10} = -908.077$ | | |
| | $d_{10} = 9.823$ | |
| $r_{11} = \infty$ (diaphragm) | | |
| | $d_{11} = 1.913$ | |
| $r_{12} = -132.304$ | | |
| | $d_{12} = 2.800 \quad n_{06} = 1.61484$ | $\nu_{06} = 51.17$ |
| $r_{13} = -26.305$ | | |
| | $d_{13} = 0.100$ | |
| $r_{14} = 28.521$ | | |
| | $d_{14} = 4.000 \quad n_{07} = 1.58913$ | $\nu_{07} = 60.97$ |
| $r_{15} = -27.839$ | | |
| | $d_{15} = 1.159$ | |
| $r_{16} = -20.897$ | | |
| | $d_{16} = 1.618 \quad n_{08}$ Graded Refractive Index Lens | |
| $r_{17} = 39.246$ | | |
| | $d_{17} = 2.362$ | |
| $r_{18} = 178.074$ | | |
| | $d_{18} = 3.286 \quad n_{09} = 1.57135$ | $\nu_{09} = 52.92$ |
| $r_{19} = -21.364$ | | |
| | $d_{19} = D2$ (variable) | |
| $r_{20} = -35.509$ | | |
| | $d_{20} = 3.297 \quad n_{010} = 1.78472$ | $\nu_{010} = 25.68$ |
| $r_{21} = -18.181$ | | |
| | $d_{21} = 1.507$ | |
| $r_{22} = -17.065$ | | |
| | $d_{22} = 1.601 \quad n_{011} = 1.78650$ | $\nu_{011} = 50.00$ |
| $r_{23} = 124.801$ | | |

| f | 39.58 | 63.11 | 100.54 |
|---|---|---|---|
| D1 | 2.500 | 6.889 | 11.083 |
| D2 | 18.382 | 9.092 | 2.500 |

$n(x) = n_0 + n_1 x$

| n(x) | | $n_0$ | $n_1$ |
|---|---|---|---|
| | d | 1.74077 | $-0.5 \times 10^{-2}$ |
| | g | 1.77589 | $-0.533 \times 10^{-2}$ |

$|f_3/f_W| = 0.841 \qquad \beta_{3T}/\beta_{3W} = 2.2376$
$|f_{22}/f_{21}| = 0.745 \qquad \Delta n_A = 0.0081$
$|n_1 \cdot f_W| = 0.1979$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_{01}, n_{02}, \ldots$ respectively represent refractive indices of respective lenses, reference symbols $\nu_{01}, \nu_{02}, \ldots$ respectively represent Abbe's numbers of respective lenses, and the coefficients of the refractive index distribution are for d- and g-rays.

\* \* \* \* \*